United States Patent
Kim et al.

(10) Patent No.: US 11,403,440 B2
(45) Date of Patent: Aug. 2, 2022

(54) PARTICLE-BASED FLUID SIMULATION METHOD USING MULTIPLE PROCESSORS AND FLUID SIMULATION APPARATUS

(71) Applicant: E8IGHT Co., Ltd, Seongnam-si (KR)

(72) Inventors: Jin Hyun Kim, Gwangju-si (KR); Kwang Joon Cho, Seongnam-si (KR); Sang Min Song, Yongin-si (KR)

(73) Assignee: E8IGHT Co., Ltd, Seongnam-si (KR)

( * ) Notice: Subject to any disclaimer, the term of this patent is extended or adjusted under 35 U.S.C. 154(b) by 206 days.

(21) Appl. No.: 16/550,997

(22) Filed: Aug. 26, 2019

(65) Prior Publication Data

US 2020/0065442 A1 Feb. 27, 2020

(30) Foreign Application Priority Data

Aug. 27, 2018 (KR) .................. 10-2018-0100492

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC ........ G06F 30/20; G06F 2111/10; G06G 7/32
See application file for complete search history.

(56) References Cited

U.S. PATENT DOCUMENTS 5,881,812 A * 3/1999 Malbrel ............... B01D 29/216
166/278
9,206,071 B2 * 12/2015 Leese ........................ C03B 3/00
(Continued)

FOREIGN PATENT DOCUMENTS

AU 2014265383 A1 * 11/2015 ............. E21B 43/16
CA 2853625 A1 * 6/2013 ......... G06F 17/5018
(Continued)

OTHER PUBLICATIONS

Yasuhide Sota et al., "Accereration of the moving paricle semi-implicit method through multi-GPU parallel computing with dynamic domain decomposition," Journal of Japan Society of Civil Engineers A2 (Applied Mechanics), vol. 69, No. 2, 2013, pp. I_95-I_105, no English Translation.
(Continued)

*Primary Examiner* — Thai Q Phan
(74) *Attorney, Agent, or Firm* — Hamre, Schumann, Mueller & Larson, P.C.

(57) ABSTRACT

The present disclosure provides a particle-based fluid simulation method using multiple processors which is performed in a fluid simulation apparatus, including modeling a simulation region including multiple particles for a fluid, dividing the simulation region into multiple sub-regions, allocating each of the multiple processors to each of the multiple sub-regions, calculating, by each of the multiple processors, flow data of multiple particles for a sub-region corresponding to each of the multiple processors, and performing a fluid simulation based on the result of the calculation. The calculating, by each of the multiple processors, flow data of multiple particles for a sub-region corresponding to each of the multiple processors includes exchanging, by each of the multiple processors, the flow data of the multiple particles with at least one adjacent processor.

10 Claims, 5 Drawing Sheets

(56) References Cited

U.S. PATENT DOCUMENTS

| | | | | |
|---|---|---|---|---|
| 9,379,904 B2* | 6/2016 | Vijayasankar | .......... | H04L 69/02 |
| 2015/0066456 A1* | 3/2015 | Shetty | ....................... | G06G 7/32 |
| | | | | 703/2 |
| 2015/0066462 A1* | 3/2015 | Shetty | .................. | G01V 99/005 |
| | | | | 703/10 |
| 2015/0066463 A1* | 3/2015 | Shetty | ....................... | G06G 7/32 |
| | | | | 703/10 |
| 2016/0236195 A1* | 8/2016 | Daridon | ................. | C12M 21/06 |
| 2016/0319641 A1* | 11/2016 | Camp | ..................... | E21B 49/00 |
| 2017/0316133 A1* | 11/2017 | Abramov | ................. | G06F 17/16 |
| 2018/0266394 A1* | 9/2018 | Abramov | .................. | F03D 9/25 |

FOREIGN PATENT DOCUMENTS

| | | | | | |
|---|---|---|---|---|---|
| CA | | 2900642 A1 * | 9/2014 | ......... | G06F 17/5009 |
| JP | | 6009075 B2 | 10/2016 | | |
| WO | WO-2014137750 A1 * | | 9/2014 | ......... | G06F 17/5009 |

OTHER PUBLICATIONS

Takashi Amisaki et al., "Development of a Dedicated PC-cluster for Molecular Dynamics Simulations and Its Application in Computational Grids," Journal of Information Processing : Computing Systems, vol. 45 No. SIG 6(ACS 6), May 15, 2004, pp. 244-253, No English translation.

The extended European Search Report issued for EP App. No. 19193927.1; dated Feb. 28, 2020.

Fernandes Davi Teodoro et al., "A domain decomposition strategy for hybrid parallelization of moving particle semi-implicit (MPS) method for computer cluster", Sep. 19, 2015, 15 pages provided.

Afzal Asif et al., "Parallelization strategies for computational fluid dynamics software: State of the Art Review", Jan. 13, 2016, 27 pages provided.

R. Elliot English et al., "Chimera Grids for water simulation", Jan. 1, 2013, 10 pages provided.

* cited by examiner

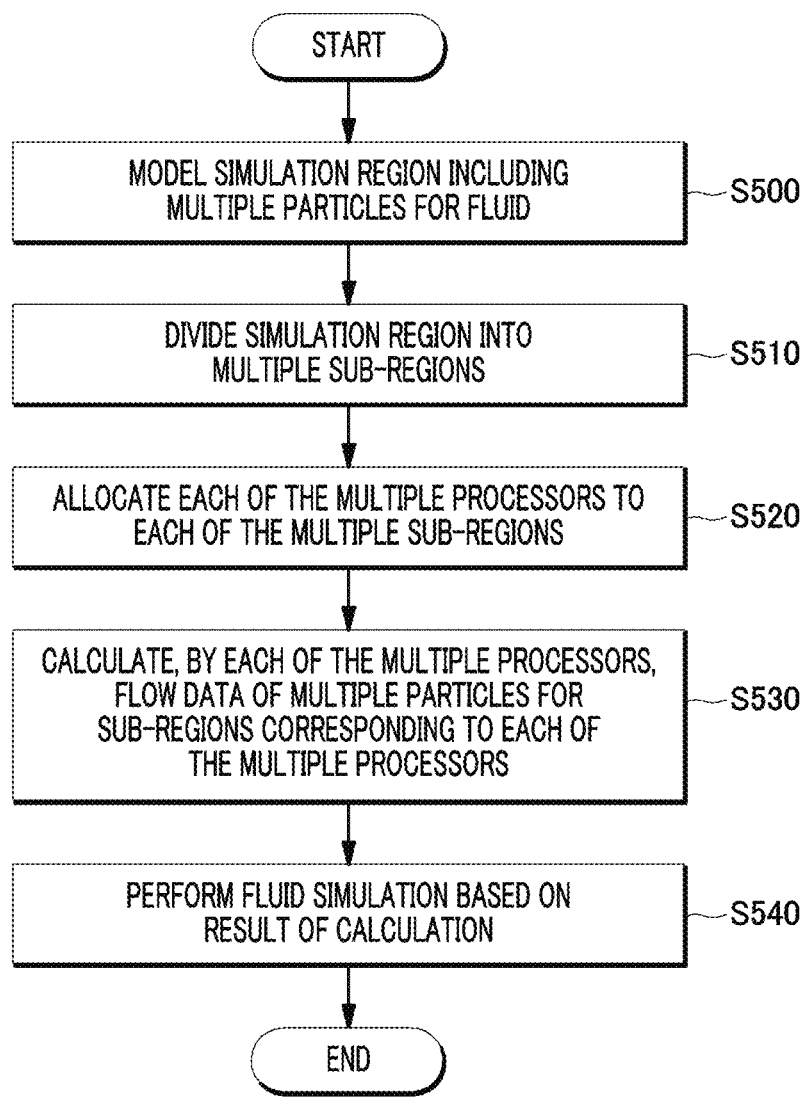

PARTICLE-BASED FLUID SIMULATION METHOD USING MULTIPLE PROCESSORS AND FLUID SIMULATION APPARATUS

TECHNICAL FIELD

The present disclosure relates to a particle-based simulation method using multiple processors and a fluid simulation apparatus.

BACKGROUND

Computational fluid dynamics is a branch of fluid mechanics that calculate fluid flows through discretization of partial differential equations such as Navier-Stokes equations by Finite Difference Method (FDM), Finite Element Method (FEM), Finite Volume Method (FVM), and Smoothed Particle Hydrodynamics (SPH).

The Navier-Stokes equations can be solved by a grid-based method and a particle-based method.

The grid-based method is used to calculate fluid flows by discretizing a spatial domain into small spatial meshes or grids, establishing the equations of motion for the respective grids, and using an appropriate numerical algorithm. That is, the grid-based method requires the generation of grids.

The particle-based method is used to calculate fluid flows by expressing a fluid as a set of a number of particles and tracking the flow of each particle.

The particle-based method expresses an analysis object as particles instead of grids and thus enables a smoother simulation of natural phenomena or physical phenomena.

That is, the particle-based method is useful to process a great change at an interface such as a free surface and useful to process phenomena that repeatedly causes physical phenomena of rigid bodies, elastic bodies, and fluids.

Recently, due to the above-described advantages, smoothed-particle hydrodynamics (SPH) is being widely used for simulating fluid flows.

However, the particle-based method needs to calculate the flow of each of particles that express a fluid and thus takes longer analysis time than the grid-based method.

Prior Art Document: Japanese Patent No. 6009075

SUMMARY

In view of the foregoing, the present disclosure provides a particle-based fluid simulation method capable of reducing analysis time and a fluid simulation apparatus.

The problems to be solved by the present disclosure are not limited to the above-described problems. There may be other problems to be solved by the present disclosure.

According to an aspect of the present disclosure, a particle-based fluid simulation method using multiple processors which is performed in a fluid simulation apparatus includes modeling a simulation region including multiple particles for a fluid, dividing the simulation region into multiple sub-regions, allocating each of the multiple processors to each of the multiple sub-regions, calculating, by each of the multiple processors, flow data of multiple particles for a sub-regions corresponding to each of the multiple processors, and performing a fluid simulation based on the result of the calculation. The calculating, by each of the multiple processors, flow data of multiple particles for a sub-region corresponding to each of the multiple processors includes exchanging, by each of the multiple processors, the flow data of the multiple particles with at least one adjacent processor.

According to another aspect of the present disclosure, a particle-based fluid simulation method which is performed in a fluid simulation apparatus including a first processor and a second processor includes modeling a simulation region including multiple particles for a fluid, dividing the simulation region into multiple sub-regions including a first sub-region and a second sub-region adjacent to the first sub-region each of which includes an overlap region overlapping with each other, allocating the first processor to the first sub-region and the second processor to the second sub-region, calculating flow data of multiple particles for the first sub-region by the first processor, calculating flow data of multiple particles for the second sub-region by the second processor, and exchanging, by each of the first processor and the second processor, flow data of the overlap region with each other.

According to yet another aspect of the present disclosure, a fluid simulation apparatus configured to simulate a particle-based fluid using multiple processors includes a memory that stores information of a simulation, a first processor, a second processor, and a third processor. The first processor performs modeling of a simulation region including multiple particles for a fluid, divides the simulation region into multiple sub-regions including a first sub-region and a second sub-region adjacent to the first sub-region each of which includes an overlap region overlapping with each other, and allocates the first processor to the first sub-region and the second processor to the second sub-region. The second processor calculates flow data of multiple particles for the first sub-region, and the third processor calculates flow data of multiple particles for the second sub-region. Each of the second processor and the third processor exchanges flow data of the overlap region with each other.

According to the present disclosure, it is possible to provide a particle-based fluid simulation method capable of reducing analysis time and a fluid simulation apparatus.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 5 is a flowchart showing a fluid simulation method in accordance with various embodiments described herein.

DETAILED DESCRIPTION

Figure 1:
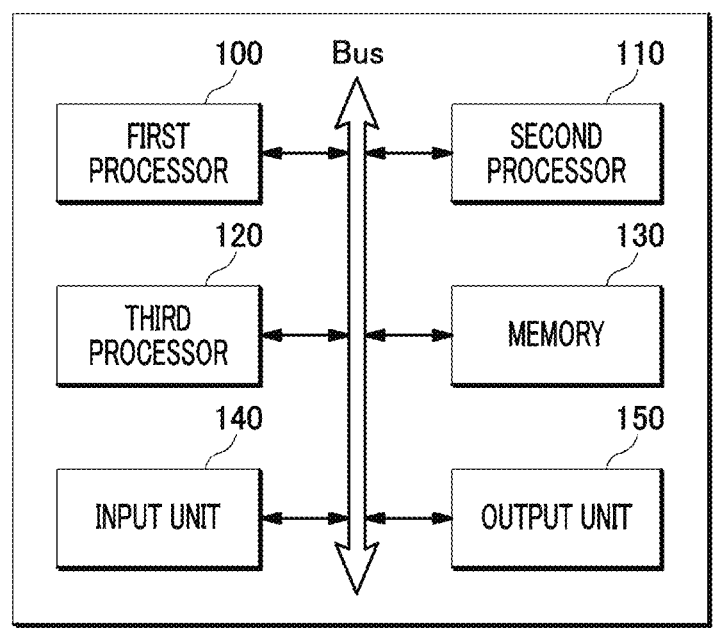
FIG. 1 is a block diagram illustrating a fluid simulation apparatus in accordance with various embodiments described herein.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Throughout the whole document, the term "unit" includes a unit implemented by hardware or software and a unit implemented by both of them. One unit may be implemented by two or more pieces of hardware, and two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereafter, an embodiment of the present disclosure will be described in detail with reference to the accompanying drawings.

FIG. 1 is a block diagram illustrating a fluid simulation apparatus in accordance with various embodiments described herein. Referring to FIG. 1, a fluid simulation apparatus 1 is configured to perform a fluid simulation by the following fluid simulation method.

The fluid simulation apparatus 1 may include, e.g., a personal computer, a tablet computer, a mobile device, a game console, and a television.

A fluid simulation method according to an embodiment of the present disclosure may be a particle-based fluid simulation method that employs, e.g., smoothed-particle hydrodynamics (SPH).

The fluid simulation method according to the present disclosure includes an application area where a fluid simulation is calculated in real time, but is not limited thereto and can also be applied to various application areas that need a fluid simulation.

Examples of the application areas may include a computer game, a medical simulation, a science application, and a computer animation.

The fluid simulation apparatus 1 may include a first processor 100, a second processor 110, a third processor 120, a memory 130, an input unit 140, and an output unit 150.

The first processor 100 may be, e.g., a central processing unit (CPU), and the second processor 110 and the third processor 120 may be graphics processing units (GPUs).

The first processor 100, the second processor 110, and the third processor 120 drive a fluid analysis solver to which the fluid simulation method of the present disclosure is applied.

Herein, the fluid analysis solver may be processed in parallel by the first processor 100, the second processor 110, and the third processor 120.

For example, the first processor 100, the second processor 110, and the third processor 120 may perform fluid simulations in parallel.

FIG. 1 illustrates only the first processor 100, the second processor 110, and the third processor 120, but more processors may be used to drive the fluid analysis solver.

The memory 130 stores the fluid analysis solver driven by at least one of the first processor 100, the second processor 110, and the third processor 120 and data about the fluid analysis solver.

For example, the memory 130 may include a first memory region in which data to be processed by the first processor 100 are stored, and a second memory region in which data to be processed by the second processor 110 and the third processor 120 are stored.

The input unit 140 receives, from a user, an input for the fluid analysis solver driven by at least one of the first processor 100, the second processor 110, and the third processor 120.

The input unit 140 may include, e.g., a keyboard, a mouse, a joystick, a touch screen, and a microphone.

The output unit 150 may display visual information and audio information of the fluid analysis solver driven by at least one of the first processor 100, the second processor 110, and the third processor 120.

The output unit 150 may include, e.g., a display and a speaker.

Hereafter, the fluid simulation method performed by the fluid simulation apparatus 1 will be described in detail.

The first processor 100 may perform modeling of a simulation region including multiple particles for a fluid.

The first processor 100 may receive information for modeling the simulation region through the input unit 140.

For example, the first processor 100 may receive at least one of geographic information, structure information, boundary condition information, particle property information, and gravitational acceleration information.

The first processor 100 may perform modeling of the simulation region based on at least one of the received information.

Herein, the structure information may include at least one of the density, the coefficient of restitution, and the coefficient of friction.

Further, the particle property information may include at least one of the particle radius, the density, the viscosity, the velocity of sound, and the initial velocity.

The first processor 100 may divide the simulation region into multiple sub-regions including a first sub-region and a second sub-region adjacent to the first sub-region.

For example, the first processor 100 may divide the simulation region into sub-regions corresponding in number to the GPUs of the fluid simulation apparatus 1.

Herein, each of the multiple sub-regions may include an overlap region overlapping with an adjacent sub-region. For example, each of the first sub-region and the second sub-region may include an overlap region overlapping with each other.

The first processor 100 may allocate each of the multiple processors to each of the multiple sub-regions. For example, the first processor 100 may allocate the second processor 110 to the first sub-region and the third processor 120 to the second sub-region.

Figure 2:
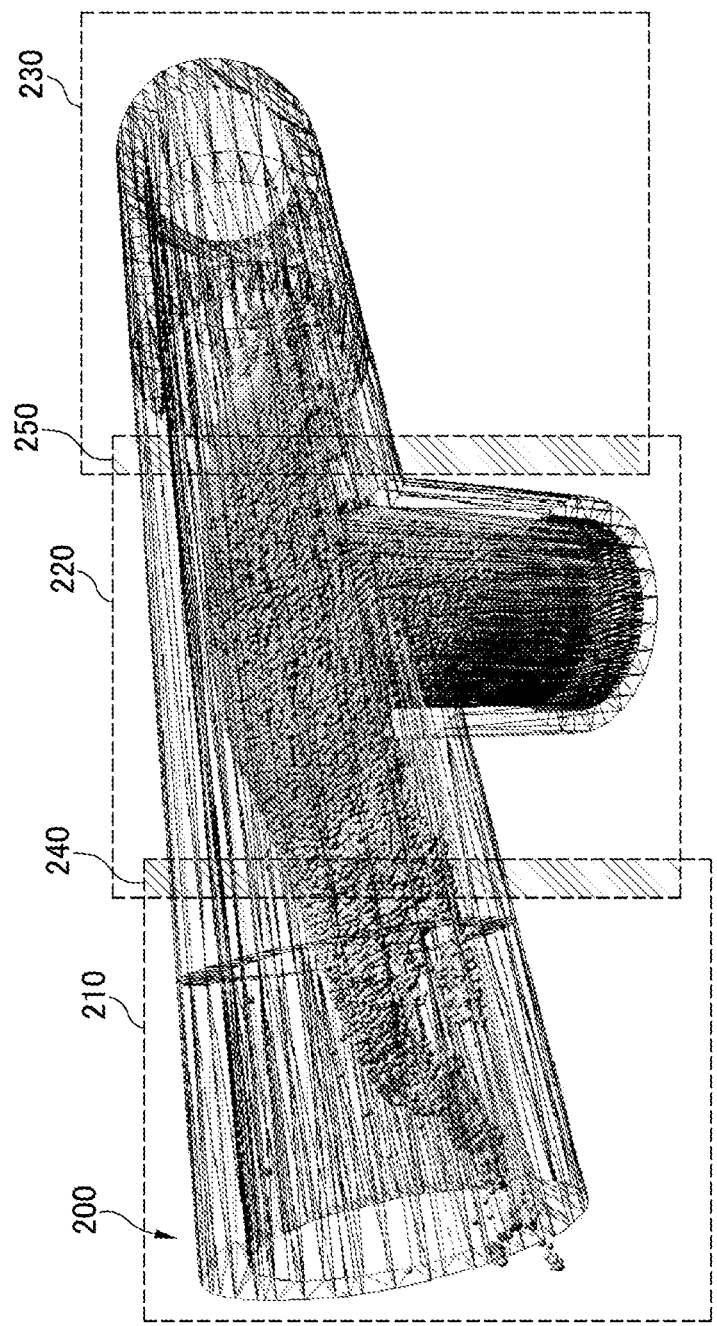
FIG. 2 illustrates an example of a fluid simulation method in accordance with various embodiments described herein.
Figure 3:
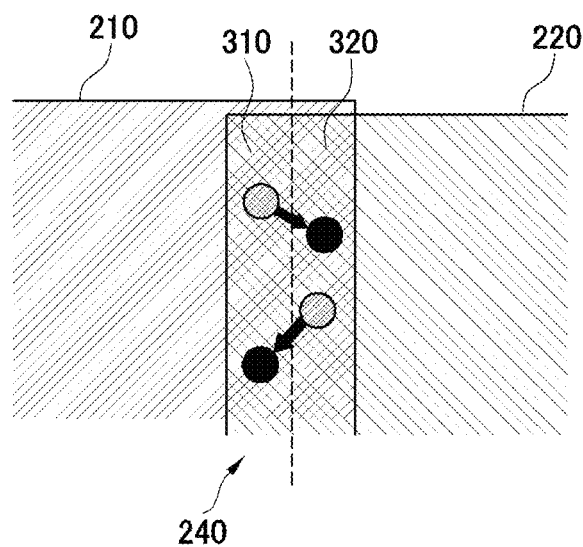
FIG. 3 is provided to explain a fluid simulation method in accordance with various embodiments described herein.

Referring to FIG. 2 and FIG. 3, the allocation of the multiple processors to the respective sub-regions of the simulation region will be described.

FIG. 2 illustrates a pipe structure and a modeled fluid (i.e., a simulation region) flowing inside the pipe structure.

The first processor 100 may divide the simulation region into a first sub-region 210, a second sub-region 220, and a third sub-region 230.

The first processor 100 may allocate the second processor 110 to the first sub-region 210 and the third processor 120 to the second sub-region 220.

Further, the first processor 100 may allocate a fourth processor (not illustrated) to the third sub-region 230. Herein, the fourth processor may be a GPU.

Herein, each of the first sub-region 210 and the second sub-region 220 includes an overlap region 240 overlapping with each other, and each of the second sub-region 220 and the third sub-region 230 includes an overlap region 250 overlapping with each other.

FIG. 3 is an enlarged view of a part of the first sub-region 210 and the second sub-region 220.

Referring to FIG. 3, the overlap region 240 between the first sub-region 210 and the second sub-region 220 may include a first overlap region 310 adjacent to the first sub-region 210 and a second overlap region 320 adjacent to the second sub-region 220.

Referring to FIG. 1 again, the second processor 110 may calculate flow data of multiple particles for the first sub-region.

The second processor 110 may calculate flow data of multiple particles for the first sub-region based on a SPH algorithm.

Herein, the SPH is used for calculating the flow of each particle using property information (e.g., mass, velocity, velocity, and acceleration) of each particle, and the property information of each particle is interpolated using a set of Kernel Functions such as a radial basis function based on the location of each particle.

When the property information of each particle is interpolated as such, successive fields such as the pressure field and the viscosity field used for calculation of the kinetics of a fluid are generated using a normal equation such as Navier-Stokes equation.

For example, the Navier-Stokes equation models a fluid as follows.

$$\rho\left(\left(\frac{\partial v}{\partial t}\right) + v \cdot \nabla v\right) = \rho g - \nabla p + \mu \nabla^2 v \quad \text{[Equation 1]}$$

In Equation 1, "v" is the velocity of particles, "ρ" is the density of particles, "p" is the pressure applied to particles, "g" is the gravity, and "μ" is the viscosity of a fluid.

According to the SPH algorithm, the density of each particle is derived by Equation 2.

$$\rho(x_i) = \sum_j m_j W(x_i - x_j, h) \quad \text{[Equation 2]}$$

Further, the pressure of each particle is derived by Equation 3.

$$f_i^{pressure} = -\sum_j m_j \frac{p_i + p_j}{2\rho_j} \nabla W(x_i - x_j, h) \quad \text{[Equation 3]}$$

Furthermore, the viscosity of each particle is derived by Equation 4.

$$f_i^{viscosity} = \mu \sum_j m_j \frac{v_j + v_i}{\rho_j} \nabla^2 W(x_i - x_j, h) \quad \text{[Equation 4]}$$

The second processor 110 calculates changes in the density, pressure, and viscosity (hereinafter, referred to as "flow data") of each particle according to the SPH algorithm. For example, the second processor 110 calculates flow data of each particle in a next time step (first time step) based on initial flow data of each particle and calculates the flow of each particle based on the calculated flow data of each particle.

Further, the second processor 110 calculates flow data of each particle in a next time step based on the flow data of each particle in the first time step and calculates the flow of each particle based on the calculated flow data of each particle.

The second processor 110 can calculate the flow of the whole fluid by calculating flow data of each particle in each time step and calculating the flow of each particle.

The third processor 120 may calculate flow data of multiple particles for the second sub-region.

The third processor 120 may calculate flow data of particles in the same way as the second processor 110.

The second processor 110 and the third processor 120 may exchange flow data of the overlap region.

Figure 4:
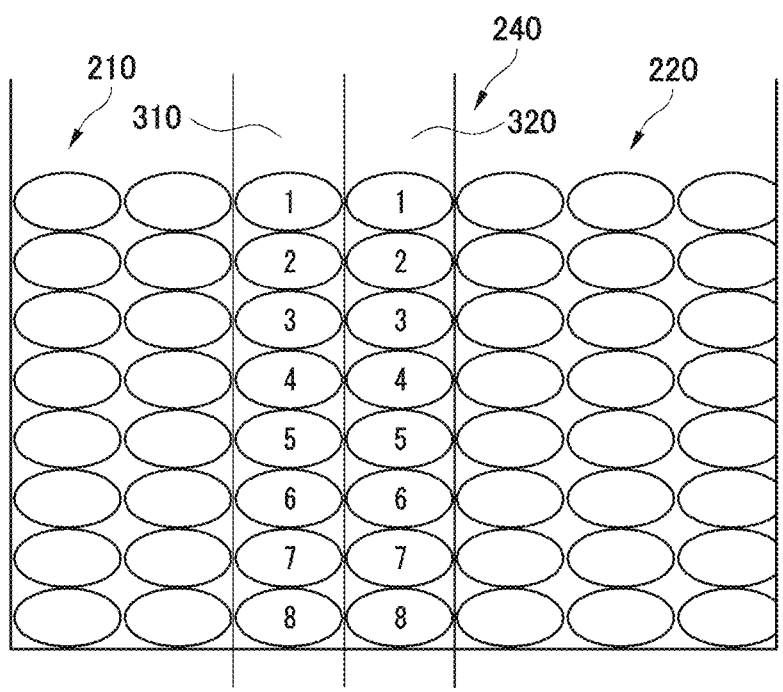
FIG. 4 is provided to explain a fluid simulation method in accordance with various embodiments described herein.

Referring to FIG. 4, a method of exchanging flow data of the overlap region between the second processor 110 and the third processor 120 will be described.

FIG. 4 is provided to explain a fluid simulation method in accordance with various embodiments described herein.

In the present disclosure, the flow of each particle is analyzed through parallel processes by multiple processors to reduce analysis time.

In this multi-processor environment, flow data need to be transferred between the processors according to the flow of particles (particularly, the flow crossing sub-regions).

Further, when fluid analysis is performed by the particle-based method, the flow of a reference particle is calculated in consideration of physical force (i.e., force caused by density, pressure, and viscosity) applied to the reference particle from its adjacent particles.

However, as for a particle located on the edge, an error occurs while calculating the flow of the particle due to the absence of adjacent particles.

To solve this problem, flow data of particles deviating from a sub-region may be transferred to a processor allocated to its adjacent sub-region. However, in this case, the calculation velocity is reduced and a separate processing routine needs to be created.

Alternatively, flow data of all the sub-regions may be shared between the processors and stored therein. However, in this case, a data sharing process needs to be performed between the processors and the processors need to store all flow data therein, which requires a large memory space.

To solve this problem in the present disclosure, each processor exchanges flow data of an overlap region with its adjacent processor.

Specifically, referring to FIG. 4, the overlap region 240 may include the first overlap region 310 adjacent to the first sub-region 210 and the second overlap region 320 adjacent to the second sub-region 220.

Herein, the second processor 110 may receive flow data of the second overlap region 320 (i.e., flow data of blue particles in FIG. 4) from the third processor 120.

In this case, the flow data of the second overlap region 320 calculated by the third processor 120 are errorless data. This is because the second overlap region 320 is not an edge of the second sub-region 220 (but the first overlap region 310 is an edge), and, thus, adjacent particles are present.

Then, the second processor 110 replaces flow data of the second overlap region 320 calculated by the second processor 110 with the flow data of the second overlap region 320 received from the third processor 120.

This is because the flow data of the second overlap region 320 calculated by the second processor 110 are error data. This is because the second overlap region 320 is an edge of first sub-region 210, and, thus, adjacent particles are not present.

Then, the second processor 110 may recalculate flow data of the first sub-region 210 based on the flow data of the second overlap region 320 received from the third processor 120.

For example, the second processor 110 may recalculate flow data of only overlap regions based on precalculated flow data of the first overlap region 310 and the flow data of the second overlap region 320 received from the third processor 120.

The third processor 120 performs the same process.

Specifically, the third processor 120 may receive flow data of the first overlap region 310 (i.e., flow data of red particles in FIG. 4) from the second processor 110.

In this case, the flow data of the first overlap region 310 calculated by the second processor 110 are errorless data.

Then, the third processor 120 replaces flow data of the first overlap region 310 calculated by the third processor 120 with the flow data of the first overlap region 310 received from the second processor 110.

This is because the flow data of the first overlap region 310 calculated by the third processor 120 are error data.

Then, the third processor 120 may recalculate flow data of the second sub-region 220 based on the flow data of the first overlap region 310 received from the second processor 110.

For example, the third processor 120 may recalculate flow data of only overlap regions based on precalculated flow data of the second overlap region 320 and the flow data of the first overlap region 310 received from the second processor 110.

As described above, each processor exchanges flow data of an overlap region with its adjacent processor, and, thus, a relatively small memory space is needed.

Further, the processors do not share all flow data to minimize memory copy. Thus, it is possible to reduce overhead caused by data transmission. Therefore, the calculation velocity can be improved.

Furthermore, even in the multi-processor environment, an error caused by the absence of adjacent particles does not occur. Therefore, it is possible to perform an accurate fluid simulation.

Referring to FIG. 1 again, the output unit 150 may perform a real-time fluid simulation based on the results of calculation performed by the multiple processors.

The output unit 150 may perform rendering and visualization of the flow of a fluid in real time based on the results of calculation performed by the multiple processors (see FIG. 2).

FIG. 5 is a flowchart showing a fluid simulation method in accordance with various embodiments described herein. The fluid simulation method according to the embodiment illustrated in FIG. 5 includes the processes time-sequentially performed by the fluid simulation apparatus illustrated in FIG. 1. Therefore, descriptions of the processes performed by the fluid simulation apparatus may be applied to the fluid simulation method according to the embodiment illustrated in FIG. 5, even though they are omitted hereinafter.

In process S500, a simulation region including multiple particles for a fluid is modeled.

In process S510, the simulation region is divided into multiple sub-regions.

In process S520, multiple processors are allocated to the multiple sub-regions, respectively.

In process S530, flow data of multiple particles for the sub-regions are calculated by the multiple processors, respectively.

In process S540, a fluid simulation is performed based on the result of the calculation.

The fluid simulation method illustrated in FIG. 5 can be embodied in a computer program stored in a medium or can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A particle-based fluid simulation method which is performed in a fluid simulation apparatus including a first processor and a second processor, comprising:
    modeling a simulation region including multiple particles for a fluid;
    dividing the simulation region into multiple sub-regions including a first sub-region and a second sub-region adjacent to the first sub-region each of which includes an overlap region overlapping with each other;
    allocating the first processor to the first sub-region and the second processor to the second sub-region;
    calculating flow data of multiple particles for the first sub-region by the first processor;
    calculating flow data of multiple particles for the second sub-region by the second processor; and
    exchanging, by each of the first processor and the second processor, flow data of the overlap region with each other,
    the overlap region includes a first overlap region that is an edge of the second sub-region and a second overlap region that is an edge of the first sub-region, exchanging, by each of the first processor and the second processor, flow data of the overlap region with each other includes:
receiving, by the first processor, a first flow data of the second overlap region from the second processor;
receiving, by the second processor, a second flow data of the first overlap region from the first processor;
replacing, by the first processor, flow data of the second overlap region calculated by the first processor with the first flow data; and
replacing, by the second processor, flow data of the first overlap region calculated by the second processor with the second flow data.

2. The particle-based fluid simulation method of claim 1, further comprising:
recalculating, by the first processor, flow data of the first overlap region based on precalculated flow data of the first overlap region and the first flow data; and
recalculating, by the second processor, flow data of the second overlap region based on precalculated flow data of the second overlap region and the second flow data.

3. The particle-based fluid simulation method of claim 1, wherein the fluid simulation method is performed in real time for simulation of a flow of the fluid in at least one of a computer game, a medical simulation, a science application, and a computer animation.

4. The particle-based fluid simulation method of claim 1, wherein
the first processor only receives the first flow data of the second overlap region from the second processor, and
the second processor only receives the second flow data of the first overlap region from the first processor.

5. A fluid simulation apparatus configured to simulate a particle-based fluid using multiple processors, comprising:
a memory that stores information of a simulation;
a first processor;
a second processor; and
a third processor,
wherein the first processor performs modeling of a simulation region including multiple particles for a fluid, divides the simulation region into multiple sub-regions including a first sub-region and a second sub-region adjacent to the first sub-region each of which includes an overlap region overlapping with each other, and allocates the first processor to the first sub-region and the second processor to the second sub-region,
the second processor calculates flow data of multiple particles for the first sub-region,
the third processor calculates flow data of multiple particles for the second sub-region, and
each of the second processor and the third processor exchanges flow data of the overlap region with each other,
the overlap region includes a first overlap region that is an edge of the second sub-region and a second overlap region that is an edge of the first sub-region,
exchanging, by each of the second processor and the third processor, flow data of the overlap region with each other includes:
receiving, by the second processor, a first flow data of the second overlap region from the third processor;
receiving, by the third processor, a second flow data of the first overlap region from the second processor;
replacing, by the second processor, flow data of the second overlap region calculated by the second processor with the first flow data; and
replacing, by the third processor, flow data of the first overlap region calculated by the third processor with the second flow data.

6. The fluid simulation apparatus of claim 5, wherein the second processor recalculates flow data of the first overlap region based on precalculated flow data of the first overlap region and the first flow data, and
the third processor recalculates flow data of the second overlap region based on precalculated flow data of the second overlap region and the second flow data.

7. The fluid simulation apparatus of claim 5, wherein the first processor is a central processing unit (CPU), and the second processor and the third processor are graphics processing units (GPUs).

8. The fluid simulation apparatus of claim 5, wherein the first processor receives at least one of geographic information, structure information, boundary condition information, particle property information, and gravitational acceleration information and performs modeling of the simulation region based on at least one of the received information.

9. The fluid simulation apparatus of claim 8, wherein the structure information includes at least one of the density, the coefficient of restitution, and the coefficient of friction.

10. The fluid simulation apparatus of claim 8, wherein the particle property information includes at least one of the particle radius, the density, the viscosity, the velocity of sound, and the initial velocity.

* * * * *